US008126417B2

(12) United States Patent
Saito

(10) Patent No.: US 8,126,417 B2
(45) Date of Patent: Feb. 28, 2012

(54) DATA PROCESSING DEVICE WITH BEAM STEERING AND/OR FORMING ANTENNAS

(75) Inventor: Shin Saito, Stuttgart (DE)

(73) Assignee: Sony Corporation, Tokyo (JP)

( * ) Notice: Subject to any disclaimer, the term of this patent is extended or adjusted under 35 U.S.C. 154(b) by 600 days.

(21) Appl. No.: 12/273,126

(22) Filed: Nov. 18, 2008

(65) Prior Publication Data

US 2009/0143038 A1 Jun. 4, 2009

(30) Foreign Application Priority Data

Dec. 3, 2007 (EP) .................................... 07122149
Jul. 4, 2008 (EP) .................................... 08159734

(51) Int. Cl.
*H04B 7/04* (2006.01)

(52) U.S. Cl. ......................... 455/272; 455/101; 375/347

(58) Field of Classification Search ........................ None
See application file for complete search history.

(56) References Cited

U.S. PATENT DOCUMENTS 5,686,926 A 11/1997 Kijima et al.
5,914,693 A * 6/1999 Takei et al. ................... 343/767
6,448,930 B1 9/2002 Judd
6,862,433 B2 * 3/2005 Callaway, Jr. ................ 455/101
7,358,921 B2 * 4/2008 Snyder et al. ................ 343/795
7,382,314 B2 * 6/2008 Liao et al. ............... 342/357.76
2003/0164800 A1 9/2003 Jordan et al.
2004/0090366 A1 5/2004 Wong et al.
2005/0239416 A1 * 10/2005 Shimizu .......................... 455/82
2007/0205943 A1 9/2007 Nassiri-Toussi et al.
2007/0224951 A1 9/2007 Gilb et al.
2009/0067371 A1 * 3/2009 Pesce et al. ................... 370/328
2010/0240327 A1 * 9/2010 Lambrecht et al. ............. 455/95

FOREIGN PATENT DOCUMENTS

EP 0 301 216 A2 2/1989
EP 1 158 605 B1 11/2001
WO WO 02/13313 A2 2/2002
WO WO 2004/088787 A2 10/2004

* cited by examiner

*Primary Examiner* — Lincoln Donovan
*Assistant Examiner* — Terry L Englund
(74) *Attorney, Agent, or Firm* — Oblon, Spivak, McClelland, Maier & Neustadt, L.L.P.

(57) ABSTRACT

A data processing device for processing signals received via a wireless link. The data processing device including a first beam steering and/or forming antenna arranged on the data processing device that receives data via the wireless link, a second beam steering and/or forming antenna arranged on the data processing device perpendicular to the first beam steering and/or forming antenna, the second beam steering and/or forming antenna receiving data via the wireless link. The data processing device also includes a processor that processes signals received by the first and second beam steering and/or forming antennas.

11 Claims, 3 Drawing Sheets

DATA PROCESSING DEVICE WITH BEAM STEERING AND/OR FORMING ANTENNAS

Figure 1:
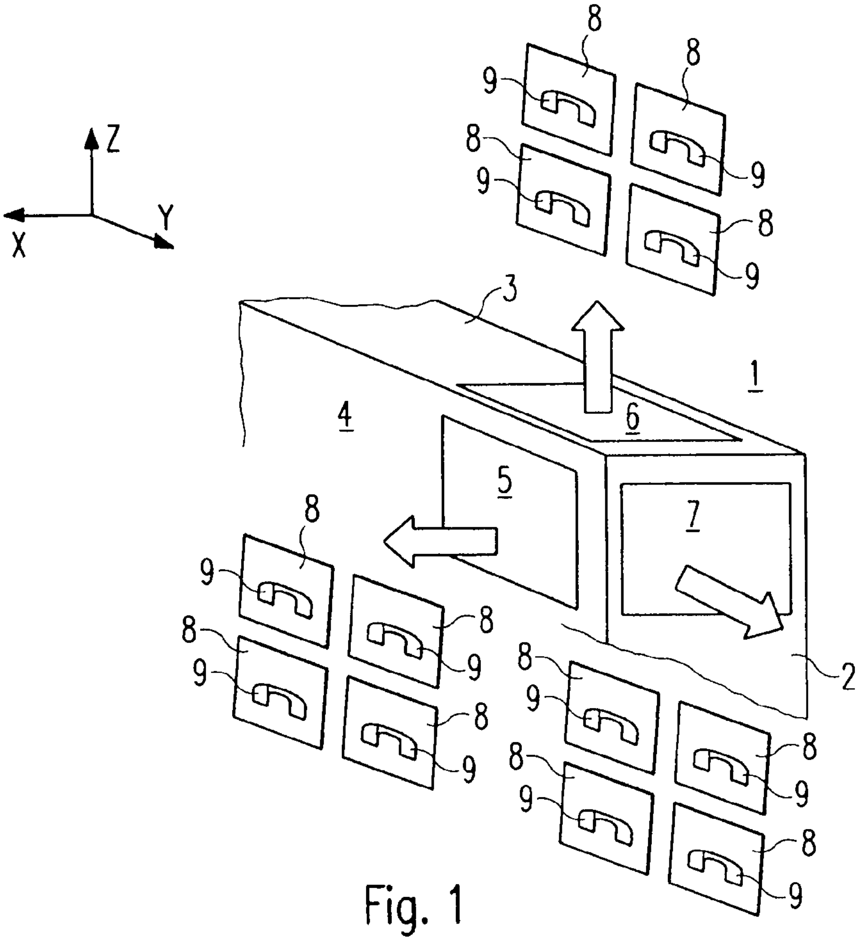

The present invention relates to a data processing device for processing signals received and/or transmitted via a wireless link.

There is an increasing demand for wireless data transmission between devices in private and office related in-door and outdoor applications. For example, the transmission of any kind of data, such as audio and/or video data, between source devices (data transmitting devices) and sink devices (data receiving devices), is being implemented more and more by means of wireless technology replacing the formerly used wired connections. Particularly the aspect of wireless data transmission in an office or private environment not only has a higher aesthetic value, but also the advantage of a higher flexibility in placing and positioning wireless devices freely without the constraints of cables, wires etc.

Modern data source and data sink devices thus may comprise antennas and other required elements enabling the transmission and/or the receipt of data via a wireless link. For example, modern television sets, monitors, beamers, dongles with HDMI interface or USB interface and the like (as non-limiting examples for data sink devices) may be provided with the necessary elements enabling a wireless reception of data from any kind of data source device. On the other hand, data source devices, such as television receivers, DVD players, computers, dongles with HDMI interface or USB interface and so forth may be provided with the necessary elements enabling a wireless transmission of data to data sink devices.

The object of the present invention is to provide a data processing device for processing signals received via a wireless link and a data processing device for processing signals to be transmitted via a wireless link, which enable a signal reception or transmission independent from the respective location at which the respective device is positioned.

The above object is achieved by a data processing device according to claim 1 and a data processing device according to claim 2. According to the present invention, a data processing device for processing signals received via a wireless link comprises a first beam steering and/or forming antenna arranged on said processing device adapted to receive data via said wireless link, a second beam steering and/or forming antenna arranged on said data processing device in an angle to said first beam steering and/or forming antenna, said second beam steering and/or forming antenna adapted to receive data via said wireless link, and processing means adapted to process signals received by said first and said second beam steering and/or forming antenna. According to the present invention, a data processing device for processing signals to be transmitted via a wireless link comprises a first beam steering and/or forming antenna arranged on said data processing device adapted to transmit data via said wireless link, a second beam steering and/or forming antenna arranged on said data processing device in an angle to said first beam steering and/or forming antenna, said second beam steering and/or forming antenna adapted to transmit data via said wireless link, and processing means adapted to process signals to be transmitted by said first and said second beam steering and/or forming antenna.

The present invention therefore suggests to use two (or more) beam steering and/or forming antennas (also called directive or directional antennas) being arranged in an angle in relation to each other, i.e. in an angle which is not zero, so that signals can be transmitted to or received from different directions. Usually, beam steering and/or forming antennas have a main radiation direction to which the radiation pattern points when the radiation pattern is not steered. The beam steering and/or forming antennas are thus arranged in a way that the main radiation directions are different from each other, but could of course be steered to the same or a similar direction depending on the arrangement of the antennas and the wanted beam direction. Thus, no matter how the device is positioned in an in-door or an outdoor environment in relation to a respective other device from which signals are received or to which signals are being transmitted, a wireless link can be established in a very flexible and simple manner by correspondingly controlling and steering the beam steering and/or forming antennas. Hereby, for example, all beam steering and/or forming antennas could be steered to a direction which enables to establish a wireless link, i.e. the beams of the beam steering and/or forming antennas would be combined to a resulting radiation pattern, or each beam steering and/or forming antenna could be steered to a separate beam direction so that several wireless links could be established, or only one beam steering and/or forming antenna which points to the wanted direction could be selected and used. The term beam steering and/or forming antenna used in the present application is intended to cover all kinds of antennas having directional and/or forming radiation characteristics including an omni-directional radiation characteristic, whereby the direction and/or the shape (or form) of the radiation pattern can be controlled or changed. For example, antennas with a narrow or a wide beam (i.e. radiation pattern) could be used.

Advantageously, in the data processing devices according to the present invention, the processing means is located next to the first and the second beam steering and/or forming antenna. In case that the data processing devices of the present invention are adapted to receive/transmit signals in a high frequency wireless system, such as a system which uses millimeter wave frequencies, such as frequencies in the GHz range (e.g. but not limited to 30 to 300 GHz), the processing means comprises a digital processing unit, such as a modem unit, and/or a high frequency processing unit (or radio frequency circuit), such as a down-conversion unit adapted to down convert the received signals from the high frequency of the wireless link to an intermediate and/or base band frequency, or an up-conversion unit adapted to convert signals from the base band and/or intermediate band to the high frequency in which the signals are transmitted. Alternatively, the radio frequency circuits could be comprised in the beam steering and/or forming antennas. In other wireless systems, different kinds of processing means are provided depending on the respective requirements. However, by using a single processing means for both the first and the second beam steering and/or forming antenna the manufacturing costs could be reduced as compared to the case in which such a processing means is provided for each of the first and the second beam steering and/or forming antenna. Further, by providing the processing means next to the first and the second beam steering and/or forming antenna, i.e. as close as possible to the first and the second beam steering and/or forming antenna, insertion losses caused by unnecessarily long signal lines could be avoided. Alternatively, the processing means could be located next to the first beam steering and/or forming antenna only, whereby it is connected to the second beam steering and/or forming antenna by means of a suitable signal line, such as a wave guide. For example, by using a substrate integrated wave guide, the signals can be supplied with a reduced propagation loss as compared to other signal lines, and also at reduced cost. Specifically, by using a flexible substrate material for the substrate integrated wave guide, more flexible integration at reduced propagation loss is possible as compared to rigid wave guides or rigid cables.

Generally, the first and the second beam steering and/or forming antenna can be implemented in, under or on the casing of the respective data processing device. Many data sink and data source devices have a casing with at least partially rectangular side walls. Advantageously, the first and the second beam steering and/or forming antenna, i.e. the main radiation directions, are therefore perpendicular to each other. This arrangement also enables to cover almost all necessary and possible directions in order to establish a wireless link with another device in order to receive or transmit signals. However, any other non zero angles between the beam steering and/or forming antennas are of course possible depending on the specific shape of the data processing device.

Further advantageously, the data processing devices according to the present invention comprise a third beam steering and/or forming antenna. Hereby, processing means as explained above can be located next to the first an the second beam steering and/or forming antenna, while a third beam steering and/or forming antenna is connected to the processing means by means of a signal line, such as a waveguide as explained above. The third beam steering and/or forming antenna can for example be arranged on the same plane (or side wall of a casing of a data processing device) as the first or the second beam steering and/or forming antenna, or may be arranged at an angle (which is not zero) in relation to the first and the second beam steering and/or forming antenna. Hereby, depending on the shape of the casing of the data processing device, the first, the second and the third beam steering and/or forming antenna could for example be arranged perpendicular to each other, i.e. on three side walls of the casing which are respectively perpendicular to each other. Hereby, even a larger number of different spatial directions are covered and can be chosen from in order to establish a wireless link with another device.

Advantageously, the first, second and/or third beam steering and/or forming antenna are phased array antenna respectively comprising two or more antenna elements arranged in the same plane. Generally, a phased array antenna is a group of antenna elements in which the relative phases of the respective signals feeding the antennas are varied in such a way that the effective radiation pattern of the array is reinforced in a desired direction and suppressed in undesired directions. In phased array antenna, the respective signals feeding the antenna elements stem from a common source or load so that each antenna element of a phased array antenna transmits the same signal, but will a respectively different phase. The antenna elements of a phased array antenna are usually arranged on a common plane, for example a substrate, so that according to the present invention the planes of the first, the second and/or the third beams steering antenna are arranged in an angle (different from zero) with each other. In line with the above explanations, the planes of the phased array antenna hereby could be perpendicular to each other. Further, the data processing devices of the present invention may comprise beam steering control means adapted to steer the beams of the beam steering and/or forming antennas. Alternatively, the data processing devices may comprise beam steering control means adapted to form the beams of the beam steering and/or forming antennas.

Alternatively, the beam steering and/or forming antennas of the present invention may be dual polarisation antennas or antenna arrays or phased array antennas. Hereby, the processing device of the present invention may further comprise a polarisation control means adapted to control the polarisation of the dual polarisation antennas in order to steer their respective beams.

The data processing devices of the present invention are intended to cover all kinds of devices which are able to receive or transmit signals via a wireless link, such as data sink devices, data source devices and any kind of combination thereof. Hereby, the data processing device adapted to process signals received via a wireless link according to the present invention may or may not include further functionalities and elements enabling the device to transmit the received or other signals to further devices via the beam steering and/or forming antennas or other wired or wireless interfaces. Similarly, the data processing device for processing signals to be transmitted via a wireless link according to the present invention may include functionalities and elements to receive the signals to be transmitted or other signals from other devices via the beam steering and/or forming antennas or other wired or wireless interfaces. Also, the functionalities of the data processing devices for processing signals received or transmitted via a wireless link according to the present invention it could be combined into a single device. Non-limiting examples for data processing devices for processing signals received via a wireless link according to the present invention are television sets, monitors, beamers, projectors and the like, in which case the processing means of the device is adapted to process the received signals in a way that the data received in the signals are obtained and transformed into a format which enables corresponding display of the data. Non-limiting examples for data processing devices for processing signals to be transmitted via a wireless link according to the present invention include cable or terrestrial television or radio receivers, DVD players, CD players, MP3 players, personal computers, laptops, servers, game consoles, camcorders, still image cameras or any other video and/or audio data source device. Further, the processing devices according to the present invention could be devices which only comprise the antenna functionality and the signal processing functionality (and no other functionalities) to transmit and/or receive signals and which can be connected to a data source or sink as described above.

The data received and/or transmitted in the wireless link can include any kind of data in any kind of modulation, coding, encryption, formatting and the like and may consist of audio and/or video data of any existing or future kind or any other data, such as signalling data, control data and so forth. The wireless system used for the wireless link can be any kind of system enabling the transmission and/or reception of wireless signals carrying data of any kind, such as electromagnetic signals, infrared signals and so forth. In case of electromagnetic signals, the devices of the present invention can be adapted to receive and/or transmit the signals in any required existing or future frequency range, for example but not limited to the millimeter wave frequency range, i.e. frequency ranges between 30 MHz and 300 MHz. For short and/or mid range limitation systems, for example in-door systems, frequencies of around 60 GHz may be advantageous, but any other suitable frequencies could be used.

Figure 2:
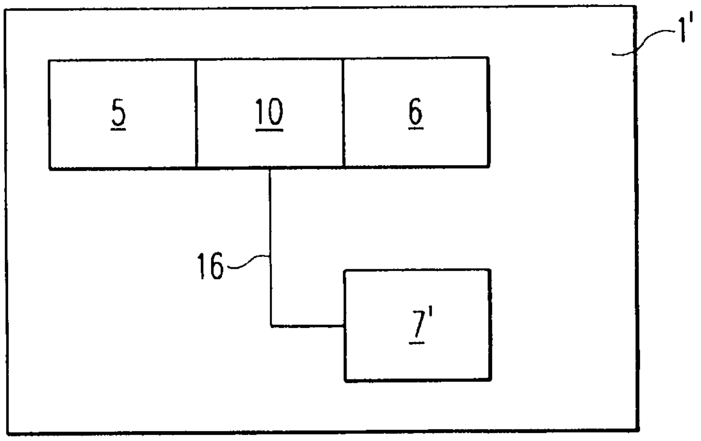
Figure 3:
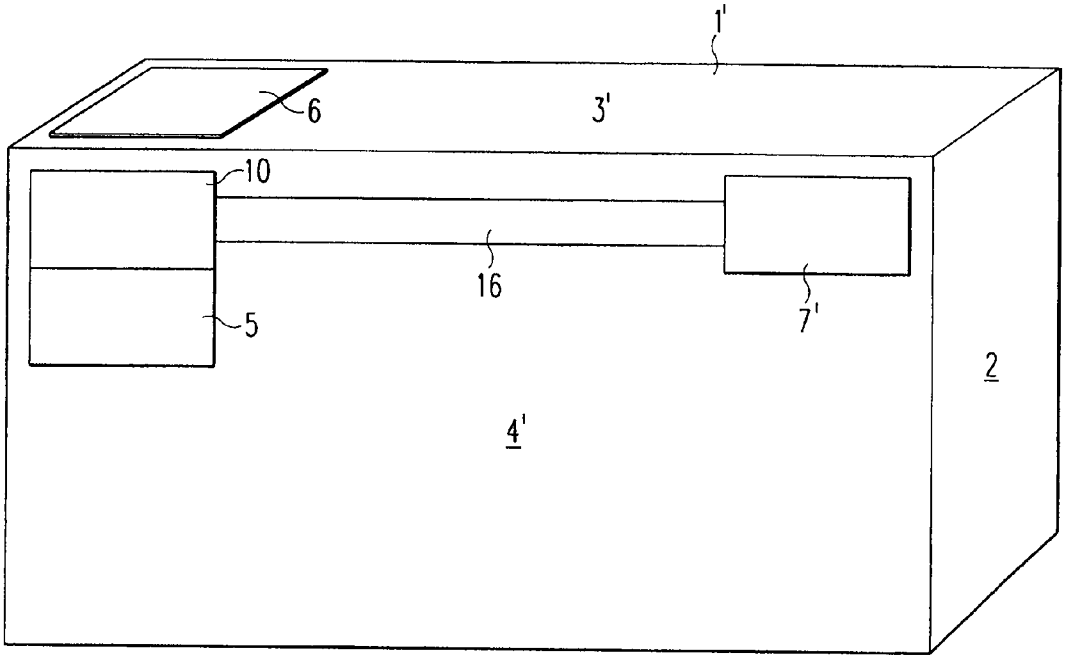
Figure 4:
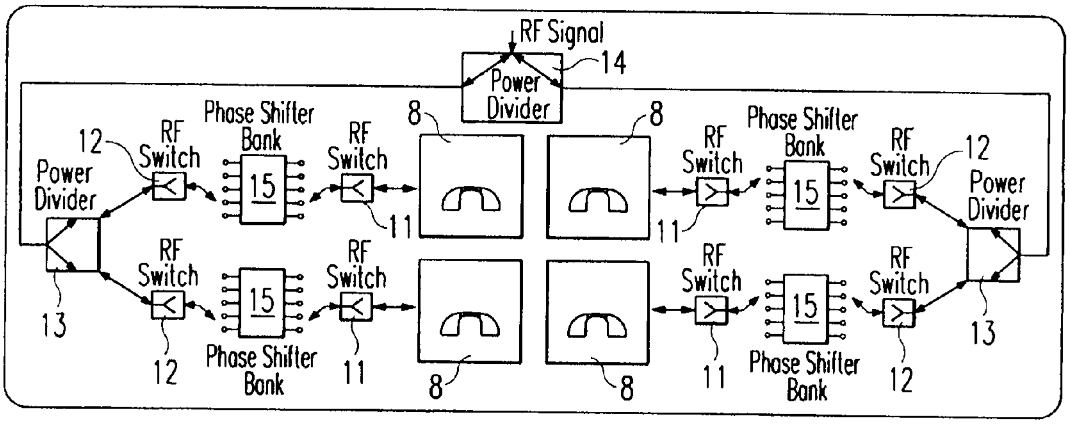
Figure 5:
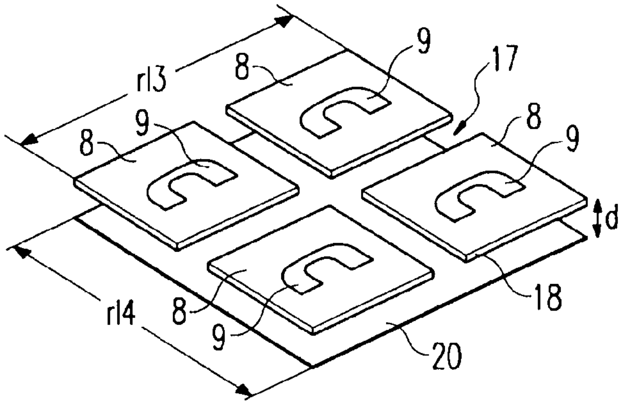
Figure 6:
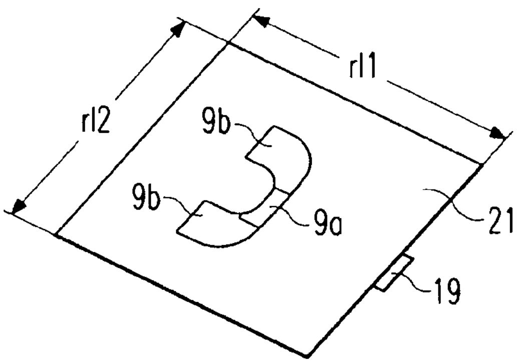
Figure 7:
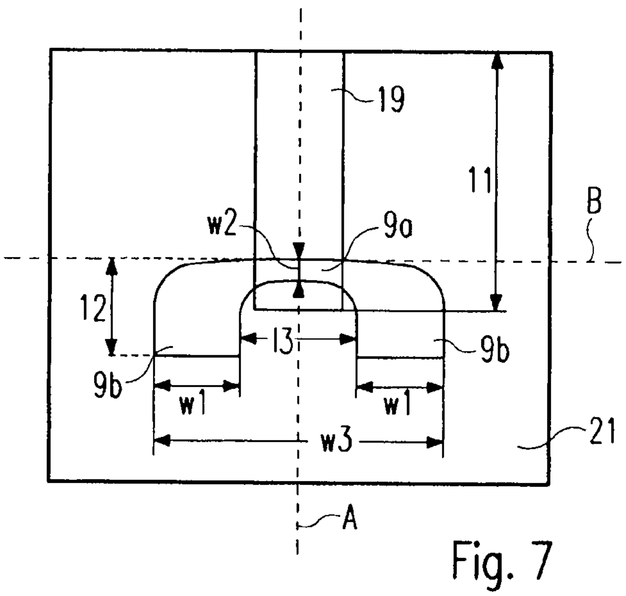

The present invention is further explained in more detail in the following description of preferred embodiments in relation to the enclosed drawings, in which FIG. 1 schematically shows a data processing device according to the present invention with a first, a second and a third beam steering and/or forming antenna, FIG. 2 schematically shows a block diagram of a data processing device according to the present invention, FIG. 3 schematically shows a further embodiment of a data processing device according to the present invention with a first, a second and a third beam steering and/or forming antenna, FIG. 4 schematically shows a functional block diagram of a phased array antenna with beam steering control means, FIG. 5 shows a perspective view of an example of a phased array antenna, FIG. 6 shows a perspective view of an antenna element of the phased array antenna of FIG. 5, and FIG. 7 shows a top view of the antenna element of FIG. 6.

FIG. 1 shows a first example of a data processing device 1 adapted to process signals received and/or transmitted via a wireless link. The data processing device 1 comprises a casing with at least three mutually perpendicular side walls 2, 3, 4, whereby the side wall 2 extends in the x-z plane, the side wall 3 extends in the x-y plane and the side wall 4 extends in the y-z plane. A first beam steering and/or forming antenna 5 in form of a phased array antenna is arranged on the side wall 4, a second beam steering and/or forming antenna 6 in form of a phased array antenna is arranged on the side wall 3 and a third beam steering and/or forming antenna 7 in form of a phased array antenna is arranged on the side wall 2.

The first beam steering and/or forming antenna 5, the second beam steering and/or forming antenna 6 and the third beam steering and/or forming antenna 7 are located very close to each other on a corner of the casing of the data processing device 1, i.e. in corners of the respective side walls 2, 3 and 4 which are immediately adjacent to each other. Generally (also for other embodiments), it might be advantageous if the antennas are close to each other but have a minimum distance from each other which is more than ¼ of the operation frequency (centre of the operation frequency bandwidth). Hereby, the beam steering and/or forming antennas 5, 6, 7 may be arranged on the outside of the casing of the data processing device 1, or may be integrated into the side walls 2, 3, 4 of the casing of the data processing device 1, so that the antenna elements are freely and openly exposed to the outside in order to be able to receive and/or transmit signals via the wireless communication link. Alternatively, the beam steering and/or forming antennas 5, 6, 7 may be arranged in a respective window in the side walls 2, 3, 4 through which the antenna elements are freely and openly exposed to the outside in order to be able to receive and/or transmit signals via the wireless communication link. Hereby, the window may be covered with a transparent, a semi-transparent or a non-transparent material or grid which allows a signal the wireless link to has through with none or a very little attenuation. Alternatively, the casing of the data processing device 1 may be made of a material which allows signals of the wireless link to pass through with none or very little attenuation. In this case, the beam steering and/or forming antennas 5, 6, 7 can be arranged immediately underneath the respective side walls 2, 3, 4.

The beam steering and/or forming antennas 5, 6 and 7 of the example of the data processing device 1 shown in FIG. 1 respectively comprise two or more (in the shown example four) antenna elements 8 which are respectively arranged in the same plane. In other words, all antenna elements 8 of a respective beam steering and/or forming antenna 5, 6, 7 are arranged in the same plane. FIG. 1 visualizes the antenna elements 8 of each of the beam steering and/or forming antennas 5, 6, 7, which, in the shown example, are formed by a flat rectangular plane of a conducting layer, for example made from metal, having a radiation element 9 in form of a slot or notch. Each conducting layer of each antenna element 8 of each beam steering and/or forming antenna 5, 6, 7 may for example be arranged on a common substrate so that each of the antenna elements 8 of each beam steering and/or forming antenna 5, 6, 7 is arranged on the same plane. The planes of the beams steering antennas 5, 6, 7 are respectively perpendicular to each other, as explained above. The beam steering and/or forming antennas 5, 6, 7 are adapted for radiating and/or receiving electromagnetic signals, for example millimeter wave signals. The beam steering and/or forming antennas 5, 6, 7 have a directional radiation pattern within the wanted and predetermined frequency bandwidth of operation and are connected for example to analogue front end circuitry of a wireless radio frequency transmitter, receiver or transceiver, which can for example be comprised in a processing means 10 as shown in and explained further below in relation to FIG. 2. The antenna elements 8 shown in the example of FIG. 1 are designed to advantageously operate in the GHz frequency range, more specifically in the 20 to 120 GHz frequency range, even more specifically in the 50 to 70 GHz range and most specifically in the 59 to 65 GHz frequency range. However, it is to be understood that the antenna elements 8 are only examples and that the operation of the beam steering and/or forming antennas 5, 6, 7 is not limited to the mentioned frequency ranges, but can be adapted to operate in different frequency ranges by using different kinds of antenna elements. For example, the beam steering and/or forming antennas 5, 6, 7 could be realised in form of dual polarisation antennas or antenna arrays, in which the horizontal and vertical polarisation can be changed in order to steer the radiation pattern. Further, the beam steering and/or forming antennas 5, 6, 7 may but do not necessarily have to be identical to each other. In other words, the beam steering and/or forming antennas 5, 6, 7 could respectively comprise different kinds of phased array antenna or identical phased array antenna.

In the example shown in FIG. 1, the three (at least almost) orthogonal or perpendicular beam steering and/or forming antennas 5, 6, 7 are adapted to cover three (out of six) possible directions of the xyz coordinate system, whereby each beam steering and/or forming antenna 5, 6, 7 e.g. covers the space of half a sphere due to the directional radiation pattern, so that it shall be possible to establish a wireless link between the data processing device 1 and another device basically in all possible mounting and positioning possibilities of the data processing device 1. In some applications, it might be sufficient to provide only the first beam steering and/or forming antenna 5 and the second beam steering and/or forming antenna 6 in order to obtain a sufficient coverage. For example, if the side wall 4 on which the first beam steering and/or forming antenna 5 is located is the front side wall of the data processing device 1, and if the side wall 3 is the side wall which is pointing upwards, for example in in-door applications it would in most positioning or mounting cases be possible to establish a wireless link with another device since the first beam steering and/or forming antenna 5 can be used for a direct (line of sight) link as well as a reflection link (non line of sight) via the floor of a room or a side wall of the room, and the second beam steering and/or forming antenna 6 can be used for an reflection link via the ceiling of the room. However, it might be possible to provide even more beam steering and/or forming antennas, for example an additional beam steering and/or forming antenna on the side wall opposite to the side wall 4 and the further additional beam steering and/or forming antenna on the side wall opposite to the side wall 2, or even an additional beam steering and/or forming antenna on the side wall opposite the side wall 3.

FIG. 2 shows a block diagram of another example of a data processing device 1' for a schematic view of which is shown in FIG. 3. The data processing device 1' is very similar to the data processing device 1 shown in and explained in relation to FIG. 1, so that all above statements in relation to functionalities, features and so forth's made above in relation to the data processing device 1 are also to in relation to the data processing device 1'. The only difference is that the third beam steering and/or forming antenna 7' of the data processing device 1' is arranged on the same side wall of the casing of the data processing device 1' and thus in the same plane as the first beam steering and/or forming antenna 5. However, as shown in FIG. 3, the third beam steering and/or forming antenna 7' is arranged in an opposite corner of the side wall in a distance to the first beam steering and/or forming antenna 5 which corresponds to the width of the data processing device 1'. Hereby, in case that the side wall 4' on which the first beam steering and/or forming antenna 5 and the third beam steering and/or forming antenna 7' are arranged is the front side of the data processing device 1', such an arrangement of the beam steering and/or forming antennas allows a even better coverage of the space and more possibilities to establish a reliable wireless link to another device. Additional beam steering and/or forming antennas could be arranged on the side wall opposite the side wall 4' or on other side walls of the data processing device 1'. Also, a further beam steering and/or forming antenna could be arranged close to the antennas 5, 6 on the side wall opposite the side wall 2, so that the antenna arrangement is similar to the one of FIG. 1 with the additional antenna 7'. All other explanations made in relation to the third beam steering and/or forming antenna 7 the example shown in FIG. 1 are also true in relation to the third beam steering and/or forming antenna 7' of the example shown in FIG. 3.

The data processing devices according to the present invention further comprise processing means or a processing unit adapted to process signals to be transmitted or received by the beam steering and/or forming antennas. In the example shown in FIGS. 2 and 3, processing means 10 is schematically shown, but it has to be understood that the processing means 10 is also provided in the data processing device 1 of the example shown in and explained in relation to FIG. 1. In case that the data processing device 1' is adapted to process signals received via the wireless link, the processing means 10 it adapted to process the signals received by the first beam steering and/or forming antenna 5, the second beam steering and/or forming antenna 6 and/or the third beam steering and/or forming antenna 7' depending on the transmission or communication system which is used for the wireless link. In case that electromagnetic signals are used for the wireless link, such as for example high frequency signals of the GHz frequency range (or millimeter range), the processing means 10 could be or comprise a high frequency or radio frequency unit adapted to down convert the received high frequency signals into intermediate frequency or base band signals. Eventually, the processing means 10 could additionally comprise further functionalities, such as demodulation units, base band processing units and other functionalities necessary and required. In the case that the data processing device 1' is adapted to process signals to be transmitted via the wireless link, the processing means 10 comprises the necessary functionalities to process signals which are to be transmitted by the first beam steering and/or forming antenna 5, the second beam steering and/or forming antenna 6 and/or the third beam steering and/or forming antenna 7'. In case that the wireless link bases on the transmission of electromagnetic signals in the high frequency range, the processing means 10 could be or comprise a high frequency or radio frequency unit adapted to up convert base band or intermediate frequency band signals to the high frequency. Alternatively, high frequency or radio frequency circuitry could be part of the antennas 5, 6, 7, 7' and the processing means 10 could comprise further necessary functionalities.

Additionally, or alternatively the processing means 10 could comprise further functionalities, such as modulation functionalities, base band processing functionalities and the like. As schematically shown in FIGS. 2 and 3, it is advantageous if the data processing device 1' only comprises a single processing means 10 which is connected to the first beam steering and/or forming antenna 5, the second beam steering and/or forming antenna 6 and the third beam steering and/or forming antenna 7'. Hereby, it is further advantageous if the processing means 10 and the beam steering and/or forming antennas are located as close to each other as possible, i.e. positioned so that losses are reduced as much as possible. As schematically shown in FIGS. 2 and 3, the first beam steering and/or forming antenna 5 and the second beam steering and/or forming antenna 6 are located next or immediately adjacent to the processing means 10 so that all kinds of losses caused by signal lines between the processing means 10 and the first and second beam steering and/or forming antenna 5, 6 can be avoided or at least reduced. However, for the third beam steering and/or forming antenna 7' which is located in a distance to the first and the second beam steering and/or forming antenna 5, 6 and thus in a distance to the processing means 10 it is advisable to use a suitable element to supply signals received by the beam steering and/or forming antenna 7' to the processing means 10 or vice versa. In FIGS. 2 and 3, this supply element 16 is schematically shown. This supply element 16 can for example be a waveguide, or a substrate integrated waveguide, whereby the substrate integrated waveguide can for example comprise a flexible substrate material in order to give more flexible integration possibilities as well as reduced propagation loss. However, other kinds of supply elements 16 could be provided and implemented, such as coaxial cables or the like.

The data processing devices 1, 1' of the present invention further comprise a beam steering control means adapted to steer the direction beams of the beam steering and/or forming antennas 5, 6, 7, 7'. Hereby, depending on the implementation of the beam steering and/or forming antennas, each beam steering and/or forming antenna 5, 6, 7, 7' could be controlled by its own specifically allocated beam steering control means, or all beam steering and/or forming antennas in the respective data processing device 1, 1' could be controlled by one common beam steering control means. FIG. 4 is a functional block diagram of a phased array antenna with four antenna elements 8 similar to the one explained in relation to FIG. 1 with additional beam steering elements 15 and other necessary elements for an actual implementation of the phased array antenna. Each of the antennas 8 has a respectively allocated phase-shift element 15 as for example a phase-shifter bank, by means of which the phase of the respective antenna element 8 can be changed in order to change the overall radiation pattern of the phased array antenna. Hereby, changing the phase input of each antenna element 8 and then steering the individual radiation patterns of each antenna element 8, the overall radiation pattern of the phased array antenna can be steered within a specific angular range around the direction of the main lobe of the radiation pattern, which is the direction perpendicular (normal) to the plane of the planar antenna elements 8 array from the respective antenna plane (as for example shown by the arrows in FIG. 1). FIG. 4 hereby shows a suggestion for a specific implementation circuitry in order to realize the beam steering possibility. Each phase shift 15 is connected to its respective antenna element via a RF switch 11. Further, each phase shifter 15 is connected to a respective power divider 13 by means of another RF switch 12. The two power dividers 13 are connected to a main power divider 14. The power dividers 13 and 14 are used to divide (in case of the antenna elements 8 being used to transmit signals) or to sum (in case of using the antenna elements 8 to receive signals) an equal signals strengths to the four antenna elements 8 (in case of transmitting) or to an analogue radio frequency front-end (in case of receiving). Additionally, a feeding structure (not shown) such as micro-strip lines may be used as feeding lines for each antenna element 8. The phase shifters 15 are used to shift the signal phase at each antenna element 8 in order to obtain the desired beam steering pattern direction. Thus, the phase shifters 15 form a beam steering control means for the phased array antenna comprising the antenna elements 8. In an alternative implementation, the phase shifters could be realised as digital elements operating in the digital domain using digital signalling process technologies. Other beam steering control means can be used, however, depending on the kind of antennas used as the beam steering and/or forming antennas 5, 6, 7, 7'. For example, a (digital) polarisation control means or unit could be used as the beam steering control means in order to change the horizontal and vertical polarisation of dual polarisation antennas or antenna arrays if such antennas are used as the beam steering and/or forming antennas 5, 6, 7, 7'.

Generally, the beam steering control means could be controlled by the processing means 10, e.g. on the basis of external control information received by the processing means or internal control information. For example, the processing means 10 could measure link conditions or receive corresponding information and control the beam steering means on that basis.

Further, the processing means 10 could e.g. select only one of the at least two beam steering and/or forming antennas of the present invention for the reception and/or transmission of signal, whereby the beam of that single selected antenna is steered to the wanted direction. Alternatively, all available beam steering and/or forming antennas could be used to receive or transmit the same data, while their beams are combined to establish a single wireless link or their beams are individually adopted to establish several wireless links. Further, different data could be received or transmitted via the several beam steering and/or forming antennas which are steered individually. Alternatively, all or some of the available beam steering and/or forming antennas could be used to receive or transmit the same data.

FIG. 5 shows a perspective view of a non-limiting example of a phased array antenna 17 which could be use as a beam steering and/or forming antenna 5, 6, 7, 7' of the present invention. The antenna array 17 of FIG. 5 shows the implementation of four antennas elements 8 in a quadratic structure on a common substrate 18. In other words, the common substrate 18, which is for example a single layer substrate, has four planar conductive layers printed on its top-side, each of the planar conductive layers comprising a radiation element 9 in form of a notch. The feeding structure 19 of the antenna 17 will be explained below. The antenna 17 may comprise a reflector plane 20, being for example a metallic layer being located in a predetermined distance from the substrate 18. However, the reflector plane 20 can also be omitted depending on the application. Instead of four antenna elements 8, a higher or lower number of antenna elements 8 can be provided in the antenna 17. Hereby, the antenna 17 may have a quadratic structure with identical length r13 and width r14 of e.g. 5 mm or more. However, the antenna 17 can also have different length and width.

FIG. 6 shows a perspective view of an antenna element 8 of the antenna 17 for radiating and/or receiving mm-wave signals. The antenna 17 has a high gain directional radiation pattern within predetermined frequency bandwidth of operation and is connectable for example to analogue (or digital) front-end circuitry of a wireless RF transceiver. The antenna 17 is designed to advantageously operate in the GHz frequency range, more specifically in the 20 to 120 GHz frequency range, even more specifically in the 50 to 70 GHz frequency range, and most specifically in the 59 to 65 GHz frequency range. However, the antenna operation is not limited to these frequency ranges, but can be adopted to operate in different frequency ranges by a corresponding downsizing or upsizing of the antenna measures and ratios.

As mentioned the antenna 17 comprises a substrate 18 which can be formed from any suitable material, such as a dielectric material or the like, and may be formed as a single layer. In each antenna element 8, a planar conducting layer 21 is formed on the substrate 18, for example, by forming a copper layer on the upper side of the substrate 18, for example by a printing technique. In the planar conducting layer 21, a radiation element 9 is formed, which has the shape of a slot. The slot is for example formed by etching technology.

On the side of the substrate 18 opposite to the conducting layer 21, a feeding structure 19 is provided, by which electromagnetic signals are supplied to the radiation element 9 in order to be transmitted or by which electromagnetic signals received by the radiation element 9 are supplied to processing circuitry, e.g. the processing means 10, connected to the feeding structure. Further, in a predetermined distance from the side of the substrate 18 on which the feeding structure 19 is provided, the reflector plane 20, formed by a conducting, for example metal, plane is located. The reflector plane operates as an electromagnetic wave screen to reflect electromagnetic waves transmitted and/or received by the radiation element 9 to cancel or suppress radiation on the backside of the substrate 18 and to increase the antenna gain in the main direction of the antenna, which is the direction perpendicular to the plane of the conducting layer 21 pointing away from the substrate 18. There might be applications, however, in which the antenna of the present invention can be implemented without such a reflector plane 20.

The feeding structure 19 can be any kind of suitable feeding structure, but is advantageously embodied as a microstrip feeding line which is applied to the backside of the substrate 18 by printing technology. Hereby, the microstrip feeding line advantageously has a 50 Ohm impedance.

The operation principle of the antenna elements 8 is as follows. An exciting electromagnetic wave is guided to the radiation element 9 through the feeding structure 19. In the radiation element 9, i.e. the slot, the magnetic field component of the exciting electromagnetic wave excites an electric field within the slot. Hereby, in order to achieve a large frequency bandwidth at the operation frequency, for example a frequency bandwidth of 10 percent of the operation frequency, the radiation element 9 comprises a middle part **9*a* and two outer parts 9*b* which are connected by said middle part 9*a* and extend away from said middle part 9*a*, so that a slot antenna is formed. The specific shape of the radiation element 9 is shown in more detail in the perspective view of the planar conductive layer 21 and the feeding structure 19 of FIG. 6 and the top view of the antenna element 8 in FIG. 7**.

In the shown embodiment of the antenna element 8, the slot of the radiation element 9 generally has a U-shape, in which the two arms of the U are formed by the mentioned outer parts **9*b* and the base connecting the two outer parts 9*b* is formed by a middle part 9***a*. The two outer parts 9*b* generally extend parallel to each other and perpendicular to the middle part 9*a*. The shown U-shape of the slot leads to the frequency bandwidth of approximately 10 percent of the operation frequency, for example a frequency bandwidth of 6 GHz and an operation frequency around 60 GHz. In the shown embodiment, the transition between the middle part 9*a* and the two outer parts or arms 9*b* is rounded. However, in different applications, the transition between the middle part 9*a* and the two outer parts 9*b* could be rectangular with corners.

As indicated in FIG. 7, the shape of the planar conductive layer 21 is generally rectangular with equally long sides r11 and r12 presenting a quadratic shape. However, different shapes could be applied in which r11 is smaller or larger than r12.

FIG. 7 which is a top-view of the antenna element 8 also shows the feeding structure 19 on the backside of the substrate in order to show the arrangement of the feeding structure 19 in relation to the radiation element 9. Specifically, the feeding structure 19, in the shown embodiment a printed microstrip line, feeds or leads signals away from the middle part 9*a* of the radiation element 9. Hereby, the feeding structure is located on the backside of the substrate 18 opposite to the planar conductive layer 21 and the slot 9, so that the feeding structure and the radiation element are decoupled in order to suppress side lobes of the radiation characteristic. The feeding structure 19 hereby feeds signals to the middle part 9*a* of the radiation element 9 from a direction which is opposite to the direction in which the two outer parts 9*b* of the radiation element 9 extend. In the two dimensional projection visualized in FIG. 7, it can be seen that the feeding structure 19 overlaps with the middle part 9*a* of the radiation element 9 in order to ensure a good coupling across the substrate 18.

The planar conductive layer 21 has two symmetry axis A and B which split the conductive layer 21 in half in the length as well as in the width direction. Hereby, the feeding structure 19 extends along and symmetrically to the symmetry-axis A and the slot of the radiation element 9 is arranged mirror symmetrically to axis A. In other words, the two outer parts 9*b* of the radiation element 9 extends generally parallel to the axis A and are mirror symmetric with respect to it. The base line of the middle part 9*a* of the radiation element 9 is arranged on the symmetry axis B. In other words, the distance between the base line of the middle part 9*a* is half of the length of the conducting layer 21 in this direction.

Generally, it is advantageous, if the two outer parts 9*b* are tapered, i.e. if the width of the two outer parts 9*b* increases away from the middle part 9*a*. Hereby, the imaginary part of the complex impedance of the radiation element can be decreased so that the overall impedance of the antenna 1 is decreased and can be matched to the impedance of the feeding structure of for example 50 Ohm.

Further, in case that the two outer parts 9*b* are tapered, the width w1 of the two outer parts at their ends is larger than the width w2 of the middle part 9*a*. Advantageously, the width w1 of the ends of the two out parts 9*b* is more than two times larger than the width w2 of the middle part 9*a*. Further, the length 13 of the middle part 9*a* is larger than the width w1 of the ends of the two outer parts 9*b*. In other words, the distance between the two outer parts 9*b* is larger than the respective width w1. Further, the over all width w3 of the radiation element 9 is larger than its length 12, whereby each of the two outer parts 9*b* has a length 12 which is longer than its width w1. The shown shape and dimensions of the planar conducting layer 21 and the radiation element 9 are particularly suitable for radiating and receiving signals in the 50 to 70 GHz frequency range.

The invention claimed is:

1. A data processing device for processing signals received via a wireless link, comprising:

a first beam steering and/or forming antenna arranged on a first side wall of said data processing device configured to receive data via said wireless link;

a second beam steering and/or forming antenna arranged on a second side wall of said data processing device perpendicular to said first beam steering and/or forming antenna, said second beam steering and/or forming antenna configured to receive data via said wireless link;

a third beam steering and/or forming antenna arranged on a third side wall of said data processing device perpendicular to said first and said second beam steering and/or forming antennas, said third beam steering and/or forming antenna configured to receive data via said wireless link, wherein the first, second and third beam steering and/or forming antennas are located at a corner, of the data processing device, formed by the mutually perpendicular first, second and third side walls; and a processor configured to process signals received by said first, said second, and said third beam steering and/or forming antennas.

2. A data processing device for processing signals to be transmitted via a wireless link, comprising:

a first beam steering and/or forming antenna arranged on a first side wall of said data processing device configured to transmit data via said wireless link;

a second beam steering and/or forming antenna arranged on a second side wall of said data processing device perpendicular to said first beam steering and/or forming antenna, said second beam steering and/or forming antenna configured to transmit data via said wireless link;

a third beam steering and/or forming antenna, arranged on a third side wall of said data processing device perpendicular to said first and said second beam steering and/or forming antennas, said third beam steering and/or forming antenna configured to transmit data via said wireless link, wherein the first, second and third beam steering and/or forming antennas are located at a corner, of the data processing device, formed by the mutually perpendicular first, second and third side walls; and a processor configured to process signals to be transmitted by said first, said second, and said third beam steering and/or forming antennas.

3. The data processing device according to one of claims 1 or 2, wherein said processor is located adjacent to the first and the second beam steering and/or forming antennas.

4. The data processing device according to one of claims 1 or 2, wherein said processor is located adjacent to the first beam steering and/or forming antenna, and said second beam steering and/or forming antenna is connected to said processor by a waveguide.

5. The data processing device according to one of claims 1 or 2, wherein said processor is located adjacent to the first and the second beam steering and/or forming antennas, and said third beam steering and/or forming antenna is connected to said processor by a waveguide.

6. The data processing device according to claim 4, wherein said waveguide is a substrate integrated waveguide.

7. The data processing device according to one of claims 1 or 2, wherein said first, second and third beam steering and/or forming antennas are phased array antennas respectively comprising two or more antenna elements arranged in the same plane, wherein the planes of at least said first beam steering and/or forming antenna and said second beam steering and/or forming antenna, and said third beam steering and/or forming antenna are arranged perpendicular with each other.

8. The data processing device according to one of claims 1 or 2, further comprising:

a beam steering controller configured to steer the beams of said first, second and third beam steering and/or forming antennas.

9. The data processing device according to one of claims 1 or 2, further comprising:

a beam steering controller configured to form the beams of said first, second and third beam steering and/or forming antennas.

10. The data processing device according to one of claims 1 or 2, wherein said first, second and third beam steering and/or forming antennas are dual polarisation antennas.

11. The data processing device according to claim 10, further comprising a polarisation controller configured to control the polarisation of the dual polarisation antennas.

* * * * *